United States Patent
Streijl

(10) Patent No.: US 8,046,457 B2
(45) Date of Patent: Oct. 25, 2011

(54) APPARATUS, METHODS, AND COMPUTER PROGRAM PRODUCTS FOR MANAGING NETWORK ELEMENTS AND ASSOCIATED NETWORK ELEMENT RESOURCES BY MULTIPLE MANAGEMENT SYSTEMS

(75) Inventor: Robert C. Streijl, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 326 days.

(21) Appl. No.: 12/139,673

(22) Filed: Jun. 16, 2008

(65) Prior Publication Data

US 2009/0313372 A1    Dec. 17, 2009

(51) Int. Cl.
  *G06F 15/173*    (2006.01)
  *G06F 7/00*    (2006.01)
(52) U.S. Cl. ........ 709/225; 709/226; 709/231; 709/232; 707/600
(58) Field of Classification Search .................. 709/225, 709/226, 231, 232; 707/600
See application file for complete search history.

(56) References Cited

U.S. PATENT DOCUMENTS

| | | | | |
|---|---|---|---|---|
| 6,041,350 | A * | 3/2000 | Takimoto | 709/223 |
| 6,389,464 | B1 * | 5/2002 | Krishnamurthy et al. | 709/220 |
| 6,708,207 | B1 * | 3/2004 | Sabelhaus et al. | 709/223 |
| 7,065,572 | B1 * | 6/2006 | Mansingh et al. | 709/223 |
| 7,398,284 | B2 * | 7/2008 | Sterling et al. | 707/694 |
| 7,555,545 | B2 * | 6/2009 | McCasland | 709/224 |
| 2002/0120741 | A1 * | 8/2002 | Webb et al. | 709/225 |
| 2005/0229152 | A1 * | 10/2005 | Connell et al. | 717/104 |
| 2006/0168117 | A1 * | 7/2006 | Paparella et al. | 709/218 |
| 2006/0217923 | A1 * | 9/2006 | Ma et al. | 702/179 |

* cited by examiner

*Primary Examiner* — William Vaughn, Jr.
*Assistant Examiner* — Umar Cheema
(74) *Attorney, Agent, or Firm* — Cantor Colburn LLP

(57) ABSTRACT

Network elements and resources associated with the network elements are manageable by multiple management systems. A request for network element resource management information is transmitted to at least two network management systems, and a reply identifying the network elements that are managed by the respective network management systems from the at least two network management systems is received.

19 Claims, 3 Drawing Sheets

APPARATUS, METHODS, AND COMPUTER PROGRAM PRODUCTS FOR MANAGING NETWORK ELEMENTS AND ASSOCIATED NETWORK ELEMENT RESOURCES BY MULTIPLE MANAGEMENT SYSTEMS

BACKGROUND

1. Technical Field

Exemplary embodiments relate generally to telecommunications data network resource management, and more particularly, to management of network elements and resources by multiple management systems.

2. Description of the Background

Within a system-based management environment, typically a single management system manages one or more designated resources. Generally, a resource can be described in terms of its attributes. While some resources express a form of state, other resources may not.

With the arrival of Policy-based Management systems comes the possibility of managed resources with state that may need to be managed by two systems, the original system (generally an operations support system/network management system (OSS/NMS)) and a policy-based control system. This concept can be extended to the instance where generally two or more systems actively manage the same resource. A possible reason for this is that the systems work in differing time scales on the same managed resource and one such system can have differing functional capabilities, generally introduced as incremental functionality. Systems have a data model representation of the resource, including for example, rules on how to change the resource (e.g., possessing a state model of the resource) and a way to communicate with the resource. Thus, in the event that one system makes changes to a managed resource, then it is very likely that the other managing systems need to be updated about the change in the resource. For example, network elements generally consist of one or more physical and logical resources. Further, each management system may have its own rules about how to manage the resource, and such rules may need to be consulted by a system that desires to change a managed resource. There are challenges associated with this scenario. Some form of communication is needed and some form of resolution to cope with the different implementations is also needed.

BRIEF SUMMARY

Exemplary embodiments include an apparatus for the management of one or more network elements and resources associated with the network elements. The apparatus includes a controller configured to transmit to at least two management systems a request for network element resource management information. The controller receives a reply identifying the network elements and resources associated with the network elements that are managed by respective management systems from the at least two management systems. Each network element and the resources associated with each network element are manageable by multiple management systems. The apparatus further comprises a network interface in communication with the controller. The network interface is configured to employ at least one network management protocol in order to receive and transmit information.

Additional exemplary embodiments include a method for managing one or more network elements and resources associated with the network elements. The method comprises transmitting to at least two management systems a request for network element resource management information and receiving a reply identifying the network elements and resources associated with the network elements that are managed by respective management systems from the at least two management systems. Each network element and the resources associated with each network element are manageable by multiple management systems. At least one network management protocol is employed in order to receive and transmit information.

Further exemplary embodiments include a computer program product that includes a computer readable medium useable by a processor. The medium has stored thereon a sequence of instructions which, when executed by the processor, cause the processor to manage one or more network elements and resources associated with the network elements by transmitting to at least two management systems a request for network element resource management information and receiving a reply identifying the network elements and the resources associated with the network elements that are managed by respective management systems from the at least two management systems. Each network element and the resources associated with each network element are manageable by multiple management systems. At least one network management protocol is employed in order to receive and transmit information.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

One or more exemplary embodiments are described below in detail. The disclosed embodiments are intended to be illustrative only since numerous modifications and variations therein will be apparent to those of ordinary skill in the art.

Figure 1:
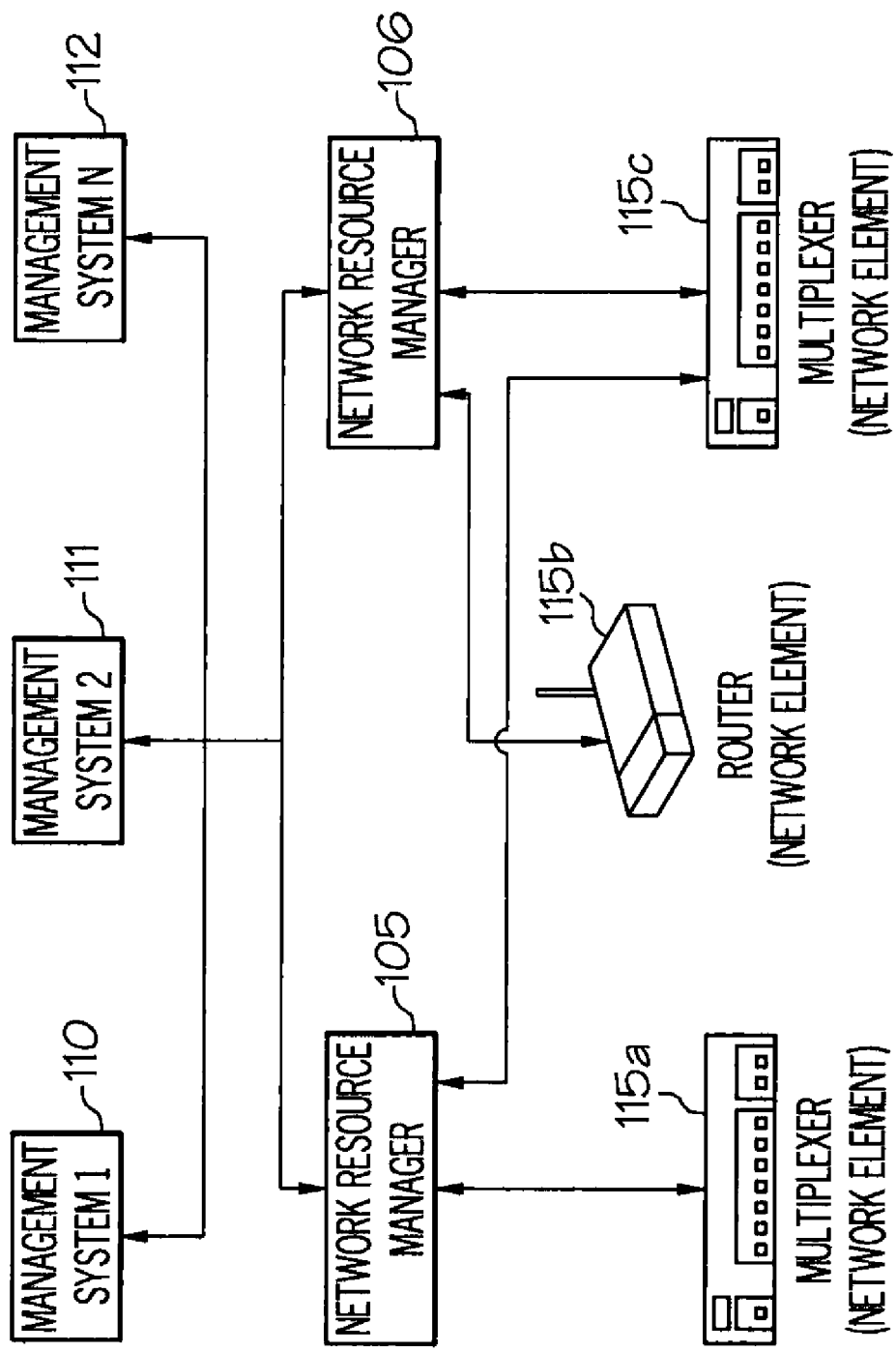
FIG. 1 is a system illustrating an implementation of a system for managing multiple network elements and associated resources by multiple management systems in accordance with exemplary embodiments.

Exemplary embodiments provide a communication solution allowing for multiple network systems that manage the same network elements and associated resources to effectively report the updating or changing of operational states of a shared network element/resource between network management systems. FIG. 1 shows an exemplary system for managing multiple network elements/resources using multiple management systems. The system comprises a plurality of network management systems 110, 111, and 112 and a plurality of network elements 115a, 115b, and 115c that are associated with the respective network management systems 110, 111, and 112. The network elements shown in FIG. 1 include a multiplexer 115a, a router 115b, and a hub 115c. It should be appreciated that there may be different network elements and fewer or less than those shown in FIG. 1. Similarly, it should be appreciated that the number of management systems 110, 111, 112 and network resource managers 105, 106 illustrated in FIG. 1 is shown by way of example, and the number may be fewer or less as appropriate for managements of the network elements/resources. Each of the network elements 115a, 115b, and 115c includes one or more physical and logical resources, such as physical ports, logical interfaces, virtual interfaces, virtual local area network (VLANs) resources, virtual routing and forwarding (VRF) resources, etc. Communication is facilitated between the management systems 110, 111, 112 and the network elements 115a, 115b, and 155c, e.g., via optional network resource managers 105, 106. An example of a network resource manager is an element management system (EMS).

Figure 2:
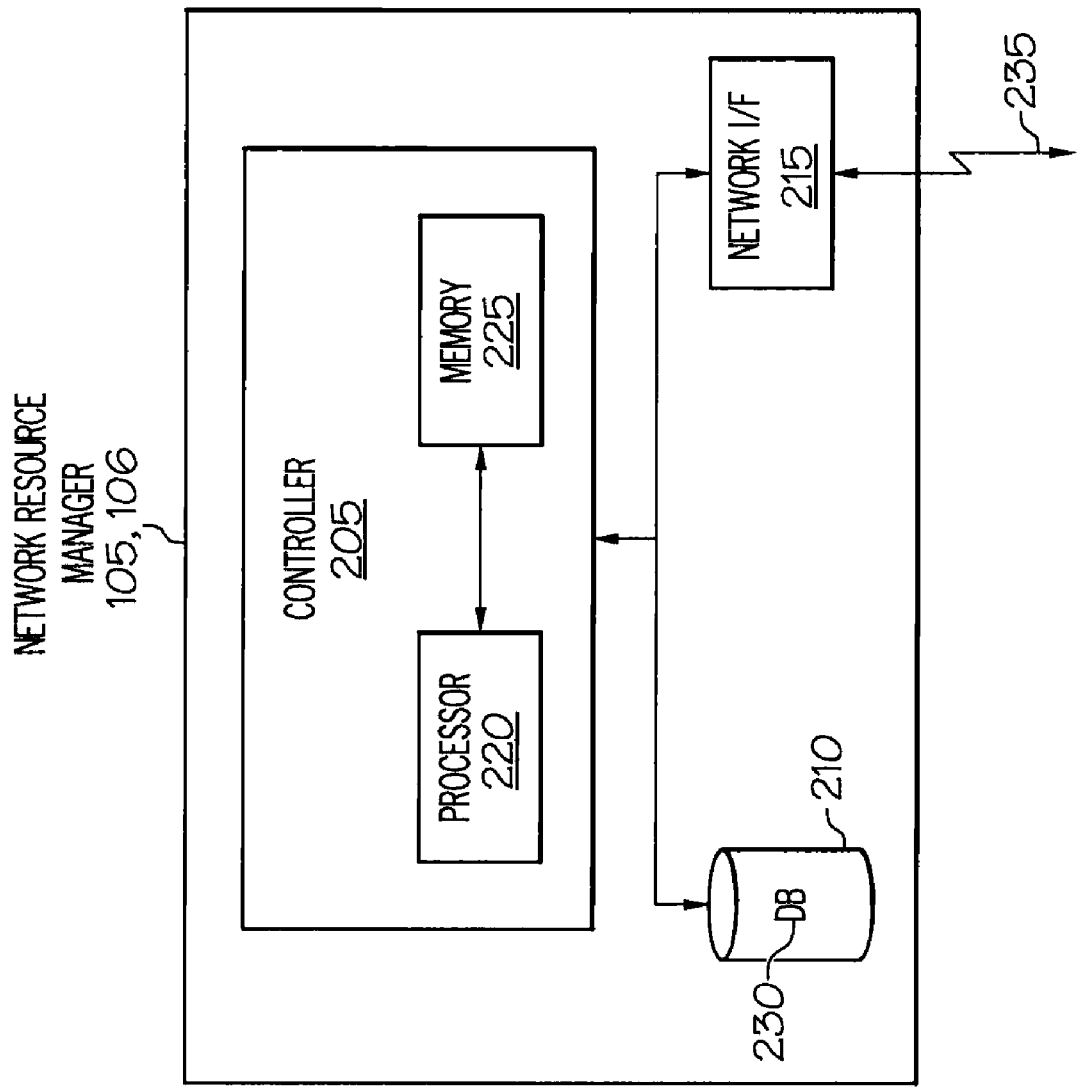
FIG. 2 illustrates a network resource management apparatus in accordance with exemplary embodiments.

As shown in FIG. 2, according to an exemplary embodiment, a network/element management apparatus 105 comprises a controller 205, a storage device 210, and a network interface 215. The controller 205 further comprises a processor 220 and a memory 225. The memory 225 and storage device 210 can comprise a non-volatile memory. The controller 205 is configured for operation via software elements (not shown), wherein the software elements are executable in the main memory 225 of the controller 205, but as persons skilled in the art will understand the elements may not in actuality reside simultaneously or in their entireties in the memory 225. The network/element management device 105 may comprise additional hardware and software elements, but they are not shown for purposes of clarity. Software elements can be loaded into the controller 205 via the network interface 215.

The controller 205 may be configured to transmit to the network management systems 110, 111, 112 a request for resource management information associated with the network elements 115a, 115b, 115c and associated resources and receive a reply identifying the network elements 115a, 115b, 115c and the resources associated with these network elements that are managed by the respective management system 110, 111, 112. According to exemplary embodiments, the controller 205 is configured to transmit a request to at least two of the network management systems 110, 111, 112 for resource management information associated with the network elements 115a, 115b, 115c and associated resources and receive a reply identifying the network elements 115a, 115b, 115c and associated resources that are managed by the respective systems 110, 111, 112. The network interface 215 is in communication with the controller 205 and is configured to employ at least one network management protocol in order to receive and transmit information 235, in accordance with exemplary embodiments. The storage device 210 stores a database 230 configured to store received network element resource information.

According to exemplary embodiments, it is the function of the network resource managers 105, 106 to learn the common network elements 115a, 115b, 115c and associated resources that are shared between the respective management systems 110, 111, and 112. The network resource managers 105, 106 may also be charged with the task of learning the resource management rules that govern the resource management operations of each of the management systems 110, 111, 112 that is associated with the respective network resource manager (105, 106). The network resource managers 105, 106 each manage a subset of the network elements 115a, 115b, 115c and associated resources. At any given time, the network resource managers 105, 106 may manage the same network elements/resources or different network elements/resources. As such, the network resource managers 105, 106 receive information regarding state changes affecting particular network elements and resources associated with the network elements. The network resource managers 105, 106 report state changing information of the network elements 115a, 115b, 115c and the resources associated with the respective network elements to all of the management systems (110, 111, and 112) that are associated with the particular network elements 115a, 115b, 115c. The network resource managers 105, 106 are further charged with the task of performing arbitration operations in the event that the resource management rules of the competing management systems (110, 111, 112) interfere with the operational objectives of one another.

For example, assume that the management system 1 (110) can possess attributes A, B and C, while the management system 2 (111) can posses attributes C, D, and E. In accordance with exemplary embodiments, it is important that the management systems 1 and 2 (110, and 111) be notified that they both possess attribute C, and as such, any changes to this attribute needs to be consulted between the systems. Thus, exemplary embodiments provide a solution that allows the management systems 110, 111, 112 to acquire information in regard to common elements that exist between management systems. Accordingly, if no common elements exist between management systems, then there is no need for communication between the systems.

Further exemplary embodiments provide a solution that allows a network resource manager, such as the network resource manager 105, 106, to identify and retain information about a particular management system's 110, 111, 112 management style in regard to a specific network element, such as the network element 115a, 115b, and/or 115c. The information may include the rules that are implemented by the management system 110, 111, 112 in regard to the particular network element 115a, 115b, 115c (and associated resources), the normalization of the management rules, what states can exist at the network elements 115a, 115b, 115c and associated resources and how to map these states. Further, a method to arbitrate between the management systems (110, 111, 112) in case of competing rules (i.e., validation) implemented within the management systems (110, 111, 112) possessing common data elements is also provided. Additionally, exemplary embodiments provide a method for the learning of higher layer application/service requests that initiate the changes within network elements and associated resources. This aspect involves ascertaining whether there are one or more network elements 115a, 115b, 115c and associated resources that require a state change operation, this function being carried out implementing the associated resource management rules of the affected management systems 110, 111, 112.

The network element resource management information can be acquired in a variety of ways. For example, in regard to acquiring information pertaining to the network elements 115a, 115b, 115c and associated resources that are associated with the differing management systems 110, 111, 112, the information can be manually loaded into a network resource managing apparatus (105, 106), periodically semi-automatically dumped into the resource managers memory storage 210 in conjunction with a manually input resource mapping configuration, or automatically loaded into the storage memory 210 with the information being based upon a common data model between the various management systems (110, 111, 112) in order to facilitate the automated mapping of network elements 115a, 115b, 115c and associated resources.

The same techniques may be implemented in order to acquire resource management information in regard to the management system's (110, 111, 112) management style for a particular network element 115a, 115b, 115c and associated resources. As a result of any of the resource management information loading techniques, the management system's (110, 111, 112) network element resource management rules are loaded into the memory storage 210 of the network resource manager (105, 106). The exemplary resource management rules may be implemented within the network resource manager 105, 106 as follows:

Management system 1 (110), resource A:
  Rule 1: Do not change when containing device is in state "repair."
  Rule 2: Do not change between 8 am and 4 pm.
Management system 2 (111), resource A, attribute Y:
  Rule 1: Do not change when containing device is in state "repair."
  Rule 2: Allow change between 3 pm and 8 pm.

As can be seen within this example there may need to be an arbitration operation based upon the application of Rule 2 for each management system 110, 111.

Within further exemplary embodiments, there are one or more network resource managers (105, 106) that can be implemented to facilitate the communication between the management systems (110, 111, and 112). According to exemplary embodiments, the management systems 110, 111, 112 only need to be aware of the network resource manager (105, 106), and the network resource manager (105, 106) will communicate with other network resource managers (105, 106) that are associated with the same network element 115a, 115, 115c and associated resources. The network resource manager (105, 106) may also be configured to enable data model and object state mappings.

The communication between the management systems 110, 111, 112 can be accomplished utilizing a variety of communication models. For example, a no-owner resource model can be implemented wherein any of the management systems (110, 111, and 112) can change the state of a network element 115a, 115b, 115c and/or associated resources, regardless of the needs of another of the management systems (110, 111, and 112). Also, a one-owner resource model can be implemented wherein a non-owner management system (110, 111, and 112) asks permission to change the state of the network element 115a, 115b, 115c and/or associated resources from the network element resource owner management system (110, 111, and 112). The owner management system (110, 111, and 112) may decide based on internal knowledge to allow or deny the request from the non-owner management system (110, 111, and 112). Yet also, a multi-owner resource model may be implemented. This model requires the sophisticated communication between all of the network element resource owning management systems (110, 111, and 112). Further, the communication model can be based on a simple rule where in the event that one management system denies a request for a change and others allow it, then the change will be denied.

Yet further exemplary embodiments provide for the capability of the network resource manager (105, 106) to arbitrate a decision in the event of competing resource management rules (i.e., validation) originating from the different management systems (110, 111, 112) that are associated with the common network element resources 115. For example, the management systems (110, 111, and 112) within an operating environment may be ranked by priority (e.g., a low priority number could indicate highest priority per common element). For example, the following rules with priority may be enacted:

Management system 1 (110), priority 1, resource A:
  Rule 1: Do not change when containing device is in state "repair."
  Rule 2: Do not change between 8 am and 4 pm.
Management system 2 (111), priority 2, resource A, attribute Y:
  Rule 1: Do not change when containing device is in state "repair."
  Rule 2: Allow change between 3 pm and 8 pm.

In this example the management system 1 (110) is determined to have priority over the management system 2 (111).

Yet additional exemplary embodiments allow for the network resource manger (105, 106) to learn a higher layer application request that initiates the changes within the network elements 115a, 115b, 115c and associated resources through the manual creation and input of rules to the network resource manager 105. For example, a request indicates that five network elements need to change state. Through communication, three of the requests for the network elements are successfully negotiated, but for the remaining two network elements, there may be rules that prevent the change being made to those network elements. An overarching rule could dictate that the entire request cannot be executed, and so none of the five network elements would change state. Another rule could be to just wait until the network elements are in a condition where the entire request can be executed, or perhaps wait a number of minutes, such as five minutes, and if still not, then cancel the request.

Figure 3:
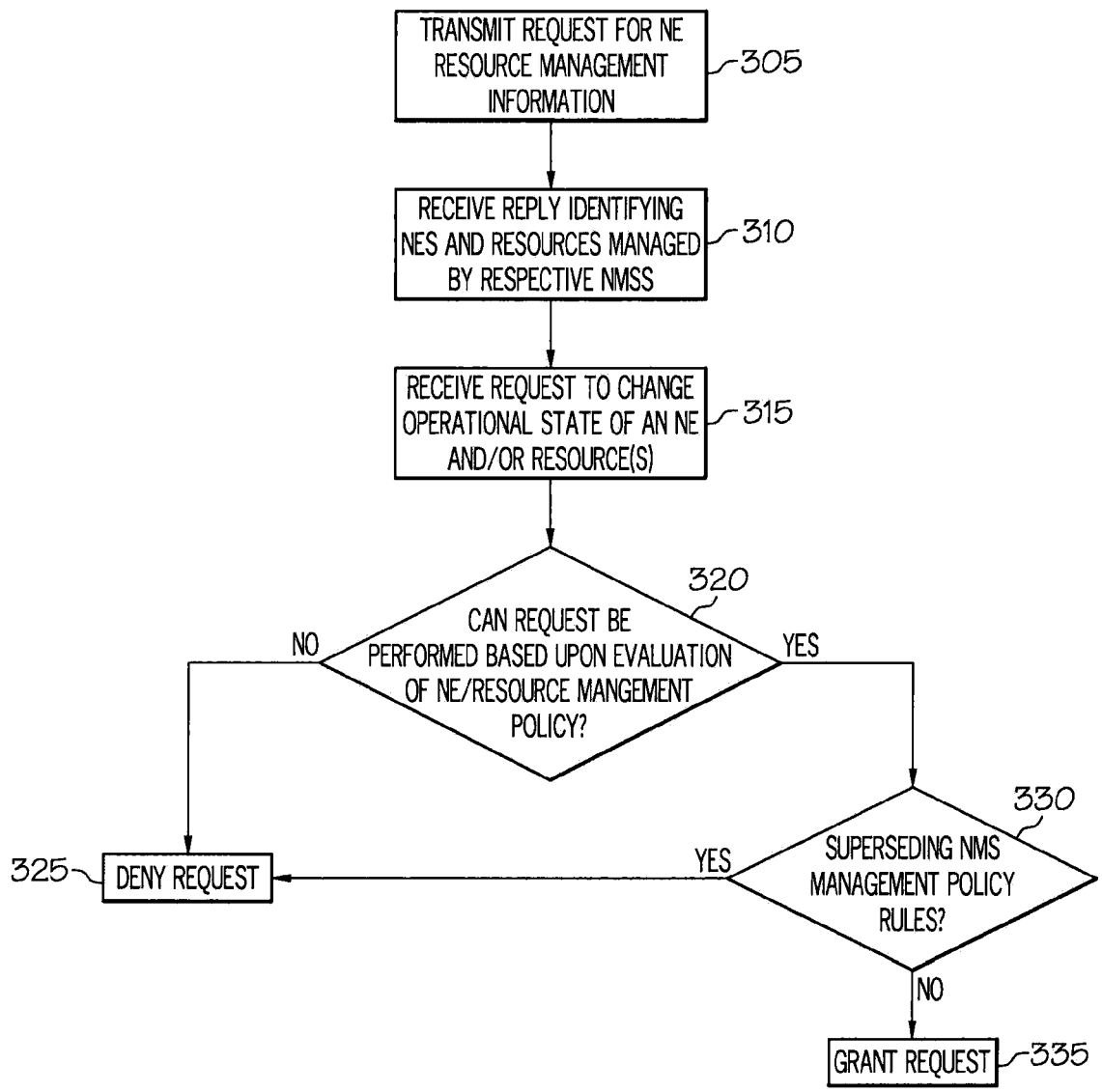
FIG. 3 is a flow diagram illustrating an exemplary embodiment of a methodology for managing multiple network elements and associated resources by multiple management systems in accordance with exemplary embodiments.

FIG. 3 shows a flow diagram detailing a method for the management of multi-system network element resources. At step 305, a request for network element resource management information is transmitted to at least two management systems (110, 111, and 112) from a controller 205 in a network resource manager (105, 106). According to exemplary embodiments, the request for network element resource management information includes network element management policy information in regard to each network element 115a, 115b, 115c and associated resources that are managed by the management system 110, 111, 112. At step 310, a reply is received at the controller in the network resource manager (105, 106) identifying the network elements (115a, 115b, 115c) and associated resources that are managed by the respective management systems (110, 111, 112).

At step 315, a request to change the operational state of the network element(s) 115a, 115b, 115c and/or the state of the resources associated with the network element(s) is received at the network resource manager (105, 106). At step 320, a determination is made, e.g., by the controller 205 within the network resource manager (105, 106), whether the request can be performed based upon an evaluation of all of the network element management policy information that is associated with the network element(s) 115a, 115b, 115c and resources associated with the network element. At step 325, the request to change the operational state of the network element(s) 115a, 115b, 115c and/or state of the resources associated with the network element is denied, e.g., by the controller 205, in the event that it is determined that conflicting network element/resource management polices are associated with the network element(s) 115a, 115b, 115c and/or associated resources. At step 330, a determination is made, e.g., by the controller 205, whether any superseding management system (110, 111, and 112) resource management policy rules exist that would deny the request. If such policies exist, then the request is denied, e.g., by the controller 205, at step 325. If such polices do not exist, then at step 335, the request for state change is granted, e.g., by the controller 205. Though the description above indicates that steps 320-335 are performed by the controller 205, it should be appreciated that a request to change the operational state of a network element may be handled, at least in part, by other entities, such as the management systems 110, 111, and 112.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A system for managing network hardware, the system comprising:
    memory;
    a resource manager comprising a controller coupled to the memory;
    the controller of the resource manager being configured to transmit to a first management system and a second management a request for network hardware resource management information;
    the controller of the resource manager being configured to receive a reply from the first management system and the second management system identifying the network hardware that are respectively managed by the first management system and the second management system;
    the controller of the resource manager is configured to receive and store first rules from the first management system and second rules from the second management system for managing the network hardware;
    the controller of the resource manager is configured to determine that the first and second rules respectively from the first management system and the second management system are for managing a same network hardware in which management of the same network hardware is shared between the first management system and the second management system;
    the controller of the resource manager is configured to notify the first management system and the second management system that the first management system and the second management system both manage the same network hardware; and
    the controller of the resource manager is configured to notify the first management system and the second management system that changes to the same network hardware need to be consulted between the first management system and the second management system.

2. The apparatus of claim 1, wherein the request for network hardware resource management information comprises network hardware management policy information in regard to the network hardware that is managed by a management system.

3. The apparatus of claim 2, wherein the controller initiates communication with the network hardware identified in the reply to the request for network hardware resource management information, wherein the reply includes information regarding physical and logical resources associated with the network hardware.

4. The apparatus of claim 3, wherein the controller is configured to facilitate communication between the first and second management systems that manage the same network hardware.

5. The apparatus of claim 3, wherein the controller is configured to change the operational state of the network hardware when the network hardware is in communication with the controller.

6. The apparatus of claim 5, wherein the network hardware management policy information received from both the first and second management systems for the same network hardware is prioritized according to predetermined criteria, where in the case of competing network hardware management policies, the network hardware management policies of the first management system and the second management system assigned a highest priority supersedes.

7. A method for managing network hardware, the method comprising:
    transmitting to a first management system and a second management system a request for network hardware resource management information;
    receiving a reply from the first management system and the second management system identifying the network hardware that are respectively managed by the first management system and the second management system, wherein a network management protocol is employed in order to receive and transmit information;
    receiving first rules from the first management system and second rules from the second management system for managing the network hardware;
    determining that the first and second rules respectively from the first management system and the second management system are for managing a same network hardware in which management of the same network hardware is shared between the first management system and the second management system;
    notifying the first management system and the second management system that the first management system and the second management system both manage the same network hardware; and notifying the first management system and the second management system that changes to the same network hardware need to be consulted between the first management system and the second management system.

8. The method of claim 7, wherein the request for network hardware resource management information comprises network hardware management policy information in regard to the network hardware that is managed by a management system.

9. The method of claim 8, further comprising:
receiving a request to change an operational state of the same network hardware;
determining if the request can be performed based upon an evaluation of the network hardware management policy information that is associated with the same network hardware;
denying the request to change the operational state of the same network hardware in the event that it is determined that conflicting network hardware management polices are associated with the same network hardware; and
granting the request to change the operational state of the same network hardware in the event that it is determined that no conflicting network hardware management policies are associated with the network hardware.

10. The method of claim 9, further comprising facilitating the communication between the first and second management systems.

11. The method of claim 10, wherein the network hardware management policy information received from each of the first management system and the second management system for the same network hardware is prioritized according to predetermined criteria, where in the case of competing network hardware management policies, a network hardware management policy of the first management system and the second management system assigned a highest priority supersedes.

12. The method of claim 11, further comprising enforcing predetermined management system management policy rules that supersede the network hardware management policy information that is associated with the same network hardware.

13. The method of claim 12, further comprising reporting the operational state change of the same network hardware to the first management system and the second management system that are associated with the network hardware.

14. A computer program product that includes a non-transitory computer readable medium useable by a processor, the computer readable medium having stored thereon a sequence of instructions which, when executed by the processor, causes the processor to manage network hardware by:
transmitting to a first management system and a second management a request for network hardware resource management information;
receiving a reply from the first management system and the second management system identifying the network hardware that are respectively managed by the first management system and the second management system, wherein a network management protocol is employed in order to receive and transmit information;
receiving first rules from the first management system and second rules from the second management system for managing the network hardware;
determining that the first and second rules respectively from the first management system and the second management system are for a same network hardware in which management of the same network hardware is shared between the first management system and the second management system;
notifying the first management system and the second management system that the first management system and the second management system both manage the same network hardware; and
notifying the first management system and the second management system that changes to the same network hardware need to be consulted between the first management system and the second management system.

15. The computer program product including the non-transitory computer readable medium of claim 14, wherein the request for network hardware resource management information comprises network hardware management policy information in regard to network hardware that is managed by a management system.

16. The computer program product including the non-transitory computer readable medium of claim 15, wherein the sequence of instructions, when executed by the processor, further causes the processor to manage the network hardware by:
receiving a request to change the operational state of the same network hardware;
determining if the request can be performed based upon an evaluation of the network hardware management policy information that is associated with the same network hardware;
denying the request to change the operational state of the same network hardware in the event that it is determined that conflicting network hardware management polices are associated with the same network hardware; and
granting the request to change the operational state of the same network hardware in the event that it is determined that no conflicting network hardware management policies are associated with the network hardware.

17. The computer program product including the non-transitory computer readable medium of claim 16, wherein the network hardware management policy information received from each of the first management system and the second management system for the same network hardware is prioritized according to predetermined criteria, where in the case of competing network hardware management policies, a network hardware management policy of the first management system and the second management assigned the highest priority supersedes.

18. The computer program product including the non-transitory computer readable medium of claim 17, wherein the sequence of instructions, when executed by the processor, further causes the processor to manage the network hardware by enforcing predetermined management system management policy rules that supersede the network element management policy information that is associated with the same network hardware.

19. The computer program product including the non-transitory computer readable medium of claim 18, wherein the sequence of instructions, when executed by the processor, further causes the processor to manage network hardware by reporting the operational state change of the same network hardware to the first management system and the second management system that are associated with the same network hardware.

* * * * *